US011203954B2

(12) United States Patent
Kolhouse et al.

(10) Patent No.: US 11,203,954 B2
(45) Date of Patent: Dec. 21, 2021

(54) PRE-LUBRICATION AND SKIP FIRE OPERATIONS DURING ENGINE CRANKING

(71) Applicant: CUMMINS INC., Columbus, IN (US)

(72) Inventors: J. Steven Kolhouse, Columbus, IN (US); Lyle E. Kocher, Whiteland, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/926,997

(22) Filed: Jul. 13, 2020

(65) Prior Publication Data

US 2021/0025298 A1 Jan. 28, 2021

Related U.S. Application Data

(60) Provisional application No. 62/877,972, filed on Jul. 24, 2019.

(51) Int. Cl.
*F01M 9/10* (2006.01)
*F01M 5/02* (2006.01)
*F02D 13/06* (2006.01)
*F02N 11/00* (2006.01)
*F01L 13/00* (2006.01)
*F02D 41/02* (2006.01)
*F01M 1/02* (2006.01)

(52) U.S. Cl.
CPC ........... *F01M 9/10* (2013.01); *F01L 13/0005* (2013.01); *F01M 1/02* (2013.01); *F01M 5/02* (2013.01); *F01M 5/025* (2013.01); *F02D 13/06* (2013.01); *F02D 41/0245* (2013.01); *F02N 11/003* (2013.01); *F01L 2013/001* (2013.01); *F01L 2800/01* (2013.01); *F01L 2810/02* (2013.01); *F01L 2820/043* (2013.01); *F01M 2001/0215* (2013.01); *F01M 2001/0253* (2013.01); *F01M 2001/0284* (2013.01); *F01M 2005/026* (2013.01); *F01M 2250/00* (2013.01); *F02D 2200/0802* (2013.01); *F02N 2200/026* (2013.01)

(58) Field of Classification Search
CPC .. F01M 9/10; F01M 1/02; F01M 5/02; F01M 5/025; F01M 2005/026; F01L 13/0005; F02D 13/06; F02D 41/0245; F02N 11/003; F02M 2006/028
See application file for complete search history.

(56) References Cited

U.S. PATENT DOCUMENTS

| 4,168,693 A | 9/1979 | Harrison |
| 4,936,272 A | 6/1990 | Whitmore |
| 5,158,050 A | 10/1992 | Hawkins et al. |

(Continued)

*Primary Examiner* — Jacob M Amick
(74) *Attorney, Agent, or Firm* — Foley & Lardner LLP

(57) ABSTRACT

A system includes a valve actuation system, a pre-lubrication pump coupled to a lubrication circuit and configured to provide oil to the valve actuation system, a catalyst for receiving and treating exhaust gasses, and a controller. The controller is configured to identify an engine start request and determine whether the catalyst temperature is below a first threshold value. In response to determining that the catalyst temperature is below the first threshold value, the controller actuates the pre-lubrication pump to direct lubricant to the valve actuation system, controls the valve actuation system to deactivate at least one cylinder of an engine, and, subsequent to deactivating the at least one cylinder of the engine, cranks the engine.

20 Claims, 3 Drawing Sheets

(56) References Cited

U.S. PATENT DOCUMENTS

| | | | |
|---|---|---|---|
| 5,862,786 A | 1/1999 | Fuchs et al. | |
| 6,655,342 B1 | 12/2003 | Wendels et al. | |
| 7,055,486 B2 | 6/2006 | Hoff et al. | |
| 9,650,925 B2 | 5/2017 | Free et al. | |
| 2009/0000592 A1* | 1/2009 | Luft | F01M 1/02 |
| | | | 123/196 R |
| 2013/0213344 A1 | 8/2013 | Stender | |
| 2015/0252743 A1* | 9/2015 | Glugla | F02D 41/0087 |
| | | | 701/104 |
| 2017/0122150 A1 | 5/2017 | Sutton | |
| 2020/0063614 A1* | 2/2020 | Dudar | F01M 5/001 |

\* cited by examiner

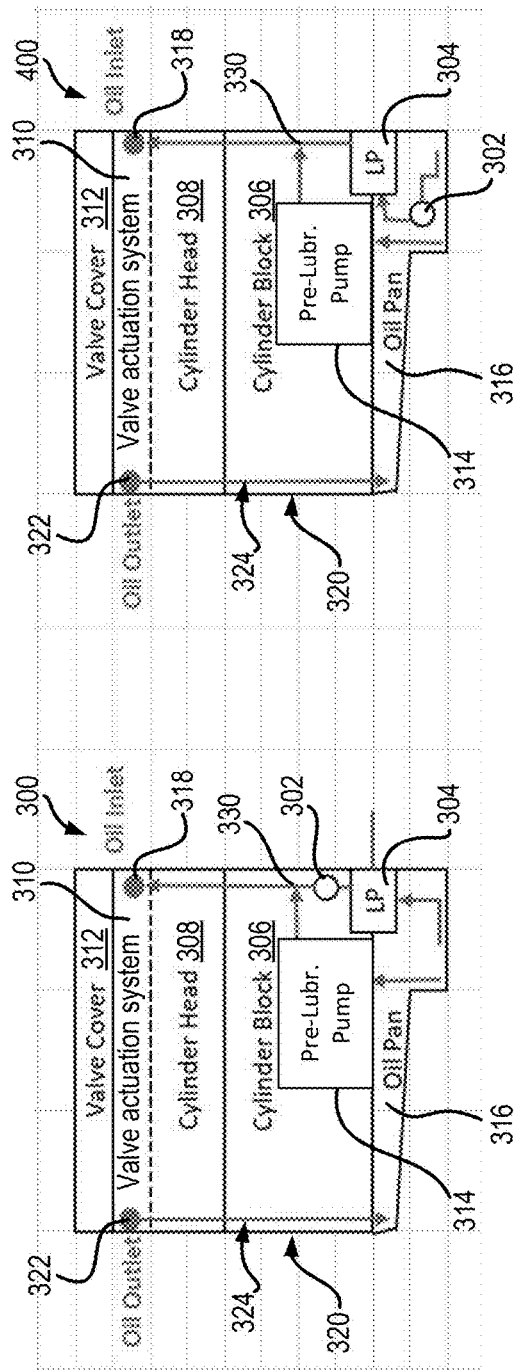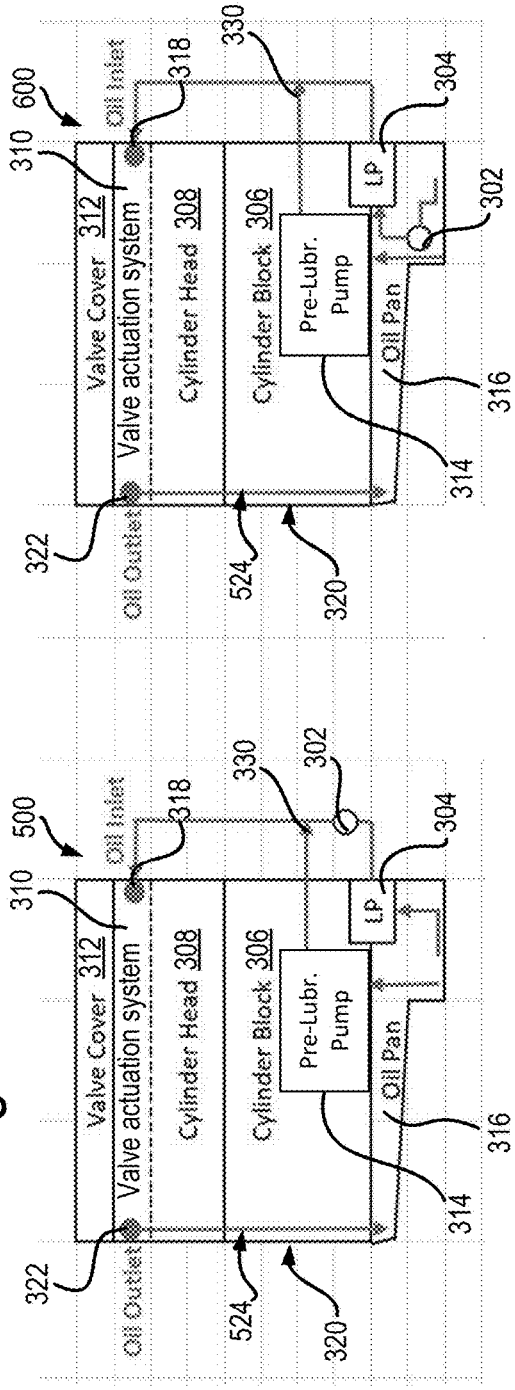
Figure 3
Figure 4
Figure 5
Figure 6

PRE-LUBRICATION AND SKIP FIRE OPERATIONS DURING ENGINE CRANKING

CROSS-REFERENCE TO RELATED APPLICATIONS

This application claims priority to U.S. Provisional Patent Application No. 62/877,972, filed Jul. 24, 2019 and the entire contents of which are incorporated herein by reference.

TECHNICAL FIELD

The present disclosure relates to systems for operating internal combustion engines, and in particular to systems and methods for engine operation and combustion control.

BACKGROUND

For internal combustion engines, such as diesel engines, nitrogen oxide (NOx) compounds may be emitted in the exhaust. To reduce NOx emissions, a selective catalytic reduction (SCR) process may be implemented to convert the NOx compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, diesel exhaust fluid, or aqueous urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system upstream of the catalyst chamber. The SCR system may include one or more sensors to monitor conditions within the exhaust system.

SUMMARY

In one aspect, a vehicle system includes a valve actuation system, a pre-lubrication pump coupled to a lubrication circuit and configured to provide oil to the valve actuation system, and a controller. The controller is configured to identify an engine start request and determine that a catalyst temperature is below a first threshold value. The controller is further configured to, in response to determining that the catalyst temperature is below the first threshold value, actuate the pre-lubrication pump to direct lubricant to the valve actuation system, control the valve actuation system to deactivate at least one cylinder of an engine, and, subsequent to deactivating the at least one cylinder of the engine, crank the engine.

In one or more embodiments, the controller is further configured to control the valve actuation system to deactivate at least one cylinder by deactivating an intake valve and an exhaust valve for the at least one cylinder. The controller may be further configured to, subsequent to actuating the pre-lubrication pump, determine that a lubricant pressure in the valve actuation system is above a second threshold value, and, in response thereto, deactivate the pre-lubrication pump. The controller may be further configured to, subsequent to cranking the engine, determine that the catalyst temperature is above the first threshold value, and, in response thereto, control the valve actuation system to reactivate the deactivated at least one cylinder of the engine.

The determination that a catalyst temperature is below the first threshold value may be based upon a predicted temperature based upon the engine operation, or it may be based upon an amount of time that the engine has not been running. The pre-lubrication pump may be affixed to a starter motor, or the pre-lubrication pump may be separate from the starter motor.

In another aspect, a method for increasing a temperature of exhaust gas from an engine includes identifying an engine start request and determining whether a temperature of a catalyst is less than a threshold temperature, where the catalyst is in exhaust receiving communication with the engine. In response to determining that the temperature of the catalyst is less than the threshold temperature, a pre-lubrication pump directs lubricant to a valve actuation system. Subsequent to the pre-lubrication pump directing lubricant to the valve actuation system, the engine is cranked.

In yet another aspect, a system for lubricating an engine prior to operating the engine includes a valve actuation system coupled to one or more valves in communication with one or more cylinders of the engine. A lubrication circuit includes an outlet to direct a lubricant from the valve actuation system to a reservoir. A lubricant pump is in fluid communication with the reservoir and is configured to direct the lubricant to an inlet of the valve actuation system while the engine is operating. A pre-lubrication pump is in fluid communication with the reservoir and is configured to direct the lubricant to an inlet of the valve actuation system before the engine is operating. A check valve is configured to prevent the lubricant from traveling upstream in the lubrication circuit.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIGS. 3-6 show various configurations of including a pre-lubrication pump with a lubrication circuit of an engine, according to various embodiments.

Figure 1:
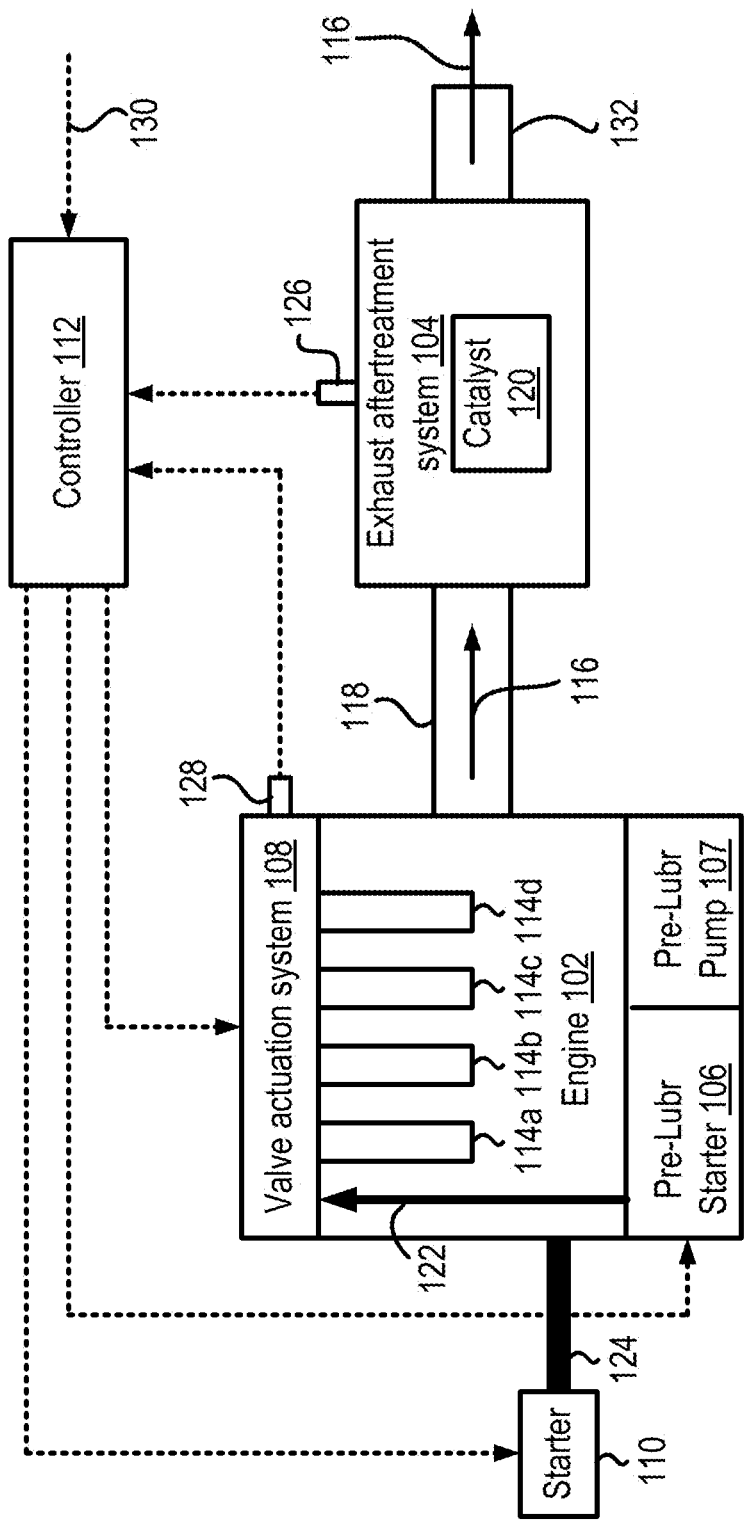
FIG. 1 shows a block diagram of an example system, according to an embodiment of the present disclosure.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, methods, apparatuses, and systems for controlling the operation of the engine to reduce pollutants in the exhaust. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Internal combustion engines (e.g., diesel internal combustion engines, etc.) produce exhaust gases that are often filtered within an aftertreatment system. The aftertreatment system includes can include a decomposition chamber that converts a reductant, such as urea or diesel exhaust fluid, into ammonia. The ammonia is mixed with the exhaust and provided to an SCR catalyst. The SCR catalyst is configured to assist the reduction of NOx emissions in the exhaust gas by accelerating a NOx reduction process between the ammonia and the NOx of the exhaust gas into diatomic nitrogen, water, and/or carbon dioxide.

The SCR catalyst operation can be affected by the operating temperature. For example, if the temperature of the SCR catalyst is below a threshold value, the effectiveness of the SCR catalyst to reduce NOx may suffer, thereby increasing the risk of high NOx emissions into the environment. The SCR catalyst temperature can be below the threshold temperature under several conditions, such as, for example, during engine startup, during cold environmental conditions, etc. As a result, when the engine is first started, the low temperature of the SCR catalyst can result in the high NOx emission content in the exhaust. While the SCR catalyst temperature could progressively increase once the engine is running after startup, until that time the exhaust gas can include undesirable amount of NOx.

The systems and methods discussed herein provide a solution that reduces the risk of undesirable levels of NOx emissions in the exhaust gas at and after startup of the engine. In particular, the engine operation is controlled to increase the rate of rise of the temperature of the SCR catalyst after startup, thereby reducing the amount of NOx emissions in the exhaust gas. The engine can include a controller that at startup can determine whether the temperature of the SCR catalyst, or the exhaust aftertreatment system in general, is below a threshold temperature value. If the temperature is below the threshold temperature value, the controller can determine that the engine can be started in a skip-fire mode, in which the controller can deactivate one or more cylinders of the engine. One aspect of operating the engine in a skip-fire mode is that the exhaust temperature can rise at a rate that is faster than that when the engine is started with all cylinders activated (i.e., not in skip-fire mode). The increased rate at which the exhaust temperature rises also increases the rate at which the temperature of the SCR catalyst rises. Therefore, the amount of time after startup that the SCR catalyst spends below the threshold temperature value is reduced. As a result, the amount of time for which the exhaust gas can include undesirable amounts of NOx is also reduced. This improves the overall emission performance of the engine system.

The controller can also control a pre-lubrication pump prior to starting the engine. The deactivation of one or more cylinders can be accomplished by controlling a valve actuation system. The valve actuation system controls the opening and closing of inlet and exhaust valves of the cylinders of the engine. One example of deactivating a cylinder of the engine can include deactivating the intake and exhaust valves corresponding to the cylinder. In some embodiments, the valve actuation system can be a hydraulic system, where an engine lubricant or engine oil can be utilized to control the operation of activating or deactivating the inlet and exhaust valves. Before startup of the engine, a lubricant pump that provides hydraulic power to a lubrication circuit carrying the engine lubricant may not be powered. This is because the lubricant pump typically receives power from the engine shaft, which before startup does not provide any torque. Thus, the controller can actuate a pre-lubrication pump to pump lubricant in the lubrication circuit and to the valve actuation system prior to starting the engine. This can enable the valve actuation system, which the controller can control to deactivate one or more cylinders of the engine.

FIG. 1 shows a block diagram of an example system 100. The system 100 includes an engine 102, an exhaust aftertreatment system 104, a pre-lubrication starter 106, a valve actuation system 108, a starter motor 110, and a controller 112. The engine 102 can be any combustion engine that converts energy generated by combustion of a fuel, such as for example, gasoline, diesel, ethanol, etc., into mechanical energy. For example, the engine 102 can be a heavy-duty internal combustion diesel engine (e.g., for use with heavy-duty vehicles). The engine 102 includes one or more cylinders. For example, the engine 102 of FIG. 1 includes four cylinders: a first cylinder 114$a$, a second cylinder 114$b$, a third cylinder 114$c$, and a fourth cylinder 114$d$ (collectively referred to as "cylinders 114"). However, the number of cylinders shown in FIG. 1 is only an example, and the engine 102 may include more or fewer cylinders.

Exhaust gases 116 generated by the engine 102 are directed to the exhaust aftertreatment system 104, which is in fluid communication with the engine 102 via an exhaust manifold 118. The exhaust aftertreatment system 104 can include, among other components, a catalyst 120 to assist in the reduction of NOx emissions in the exhaust gases 116 by accelerating a NOx reduction process between ammonia and the NOx of the exhaust gas into diatomic nitrogen, water, and/or carbon dioxide. While not shown in FIG. 1, the exhaust aftertreatment system 104 also can include a particulate filter to filter solid particles from the exhaust gases 116, a decomposition chamber to convert a reductant, such as, for example, urea or diesel exhaust fluid, into ammonia, and other aftertreatment components. The exhaust aftertreatment system 104 can include an outlet 132, through which exhaust gases 116 treated by the exhaust aftertreatment system 104 are released into the environment.

The system 100 also includes the valve actuation system 108 that can be utilized to control the operation of the cylinders 114. For example, the valve actuation system 108 can include one or more solenoids that can control the positions of valve lifters or rocker arms to decouple the exhaust and intake valves from camshafts. For example, where the engine 102 utilizes an overhead cam design, the engine 102 can include two interlocked rocker arms, one that follows the cam profile and another that actuates the valves. The mechanical motion from the first rocker arm to the second rocker arm is aided by a locking pin, the release of which can result in the second rocking arm, which controls the valves, to remain motionless despite the first rocking arm moving in response to the cam. The controller 112 can actuate a solenoid that alters oil flow to the locking pin, thereby moving the locking pin in a position that disengages the two rocking arms. In some other examples, the engine 102 may employ other mechanisms for transferring mechanical power from the camshaft to the intake an exhaust valves. The controller 112 can control one or more electrical, mechanical, or electro-mechanical actuators that can disengage the intake and exhaust valves from the camshaft, thereby disabling the corresponding cylinder. In some embodiments, the engine 102 may utilize electrically actuated intake and exhaust valves. In such embodiments, the controller 112 can deactivate the cylinders by deactivating the electrical actuation of the corresponding intake and exhaust valves.

The system 100 also can include the pre-lubrication starter 106. The pre-lubrication starter 106 can be coupled to a pre-lubrication pump 107 that can pump lubricant from a reservoir, e.g., an oil pan of the engine 102, into a lubrication circuit 122. The pre-lubrication pump 107 can be separate from a lubrication pump that is coupled to a crankshaft 124 of the engine 102. Typically, the lubricant pump coupled to the crankshaft 124 of the engine 102 is activated only after the engine 102 is started. On the other hand, the pre-lubrication pump 107 can be activated independently of the engine 102. Once the pre-lubrication starter 106 is activated, lubricant can be provided to the valve actuation system 108, thereby allowing deactivation of one or more cylinders 114. The system 100 also includes a starter motor 110 coupled to the crankshaft 124. The starter motor 110 can be, for example, an electric motor that can crank the engine 102. Activating the starter motor 110 can cause the engine 102 to crank. As discussed below, the controller 112 can delay starting the starter motor 110 until the pre-lubrication starter 106 has provided lubricant to the valve actuation system 108. It should be noted that the pre-lubrication pump 107 can be separate (i.e., not attached to) from the starter motor 110. Alternatively, the pre-lubrication pump 107 can be affixed or otherwise coupled to the starter motor 110.

The controller 112 can control the operation of various components of the system 100. The controller 112 can comprise a microcontroller, a microprocessor, or any logic circuit that can receive inputs and generate outputs based on the inputs and a set of instructions. In some examples, the controller 112 can be coupled to a memory that can store the instructions executed by the controller 112. In some embodiments, the controller 112 can be an electronic control module of a vehicle in which the system 100 is installed. The controller can receive inputs from various sensors mounted in the system 100. For example, the controller 112 can receive data from a temperature sensor 126 mounted on the exhaust aftertreatment system 104. The data received from the temperature sensor 126 can indicate the temperature of the catalyst 120. The data received from the temperature sensor 126 can be an analog voltage signal or digital data indicative of the temperature sensed by the temperature sensor 126. In some embodiments, the temperature sensor 126 can be mounted at locations other than the exhaust aftertreatment system 104. For example, the temperature sensor can be mounted on the outlet 132 to sense the temperature of the exhaust gases 116 exiting the exhaust aftertreatment system 104. The temperature of the exhaust gases 116 at the outlet 132 can provide an indication of the temperature of the catalyst 120. The controller 112 can also receive input from a pressure sensor 128 mounted in the valve actuation system 108. Data received from the pressure sensor 128 can provide an indication of a hydraulic pressure in the valve actuation system 108. Data received from the pressure sensor 128 can be an analog voltage or digital data indicative of the pressure sensed by the pressure sensor 128. In some embodiments, the pressure sensor can be mounted in the lubrication circuit 122. The controller 112 can also receive an engine start input 130. The engine start input 130 can be received from an engine start switch that an operator can activate to start the engine 102.

Figure 2:
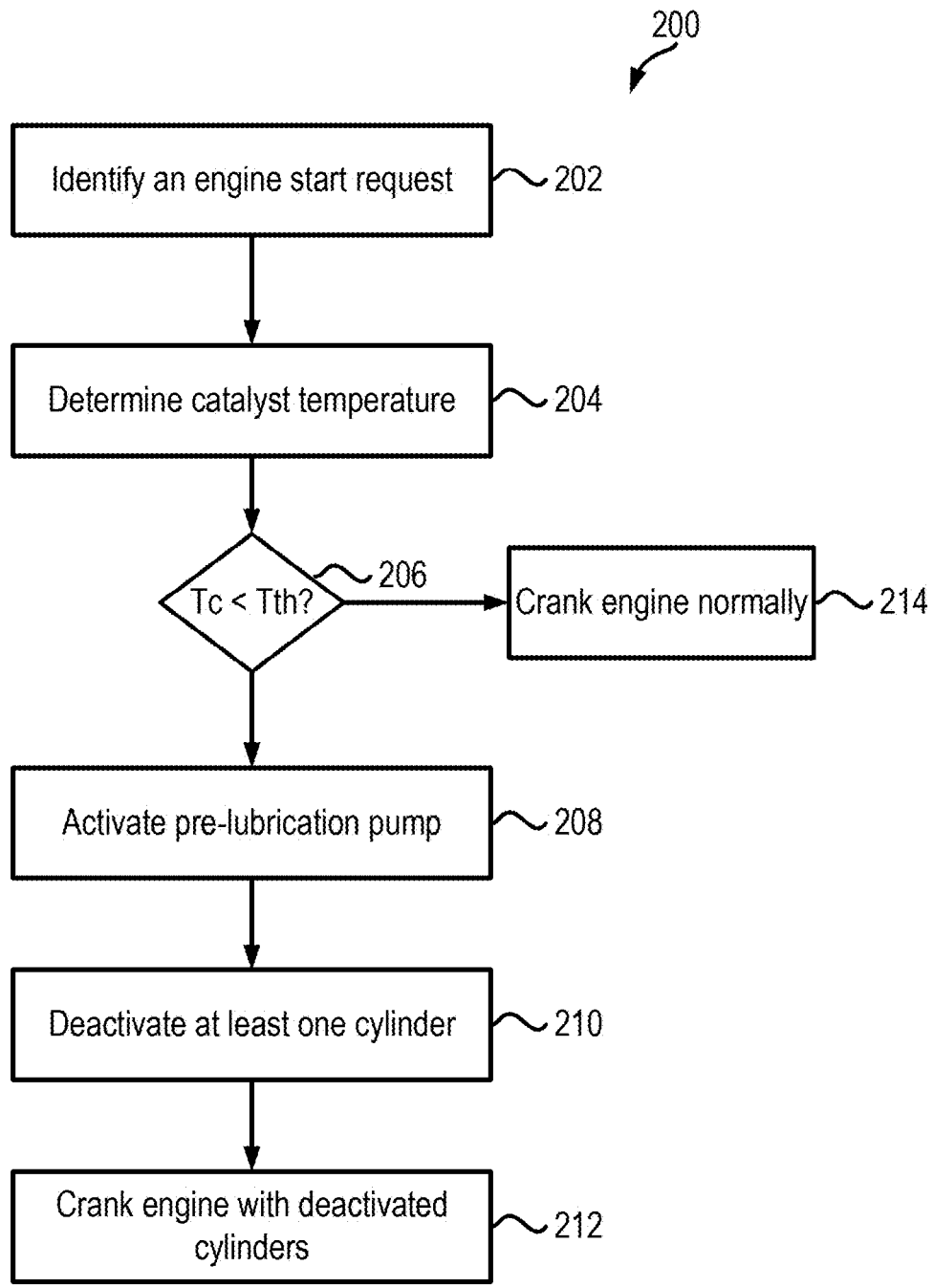
FIG. 2 shows a flow diagram of an example process to control the operation of the example system shown in FIG. 1.

FIG. 2 shows a flow diagram of an example process 200 for the operation of the system 100. The process 200 can be executed, for example, by the controller 112 shown in FIG. 1. The process 200 includes identifying an engine start request (202). The controller 112 can identify an engine start request, for example, based on the engine start input 130 received from an engine start switch. At 204, the catalyst temperature is determined. The controller 112 can determine catalyst temperature based at least one the data received from the temperature sensor 126. For example, if the temperature sensor 126 is mounted in the vicinity of the catalyst 120, the controller can determine that the temperature data received from the temperature sensor 126 is indicative of the temperature of the catalyst 120. In some embodiments, the controller 112 can process the data received from the temperature sensor 126 to determine the temperature of the catalyst 120. For example, if the temperature sensor is mounted on the outlet 132 to sense the temperature of the exhaust gases 116 downstream of the exhaust aftertreatment system 104, the controller 112 can process the data to estimate the temperature of the catalyst 120. For example, the controller 112 can estimate the catalyst temperature based on a mathematical formula or a look up table that provides an estimate of the catalyst temperature based on the temperature of the exhaust gases 116 downstream of the exhaust aftertreatment system 104.

The process 200 continues at 206 by determining whether the catalyst temperature is less than a threshold temperature value. The threshold temperature value can be indicative of a temperature of the catalyst 120 below which the exhaust gases 116 downstream of the exhaust aftertreatment system 104 can include NOx that are greater than a pre-determined value. In some embodiments, the threshold temperature value can be experimentally pre-determined and stored in memory, which can be accessed by the controller 112. The determination of whether the catalyst temperature is below the threshold value can be based upon, for example, a physical temperature measurement, a predicted temperature based upon the engine operation, or an amount of time that the engine has been in an nonoperating condition (i.e., has not been running).

If the controller 112 determines that the catalyst temperature is less than the threshold temperature value, the controller 112 can determine that the engine 102 is to be started with at least one cylinder deactivated (or in a skip-fire mode). In response to the controller 112 determining that the catalyst temperature is not below the threshold temperature value, at 214 the controller 112 can start the engine normally without deactivating the cylinders 114. As mentioned above, starting the engine 102 with at least one deactivated cylinder can increase the rate of increase in the temperature of the catalyst 120.

In response to determining that the catalyst temperature is less than a threshold temperature value, at 208, the pre-lubrication pump 107 is activated (e.g., via the activation of the pre-lubrication starter 106). The controller 112 can start the pre-lubrication pump 107 to provide lubricant to the valve actuation system 108. Actuating the pre-lubrication pump 107 can include communicating a signal to the pre-lubrication pump 107 to pump lubricant into the lubrication circuit 122 to the valve actuation system 108. The pre-lubrication pump 107 can pump oil from a reservoir, such as an oil pan of the engine 102, or a separate lubricant reservoir. In some embodiments, the valve actuation system 108 can be a hydraulic system. For effective operation of the valve actuation system 108, the controller 112 can ensure sufficient hydraulic pressure in the valve actuation system 108. During operation of the engine 102, the hydraulic pressure is provided by a lubricant pump, which is connected to the crankshaft 124 of the engine 102. However, as the engine 102 is not cranked, the controller 112 can enable the pre-lubrication pump 107 to pump oil or lubricant in the valve actuation system 108 to provide hydraulic pressure. Activating the pre-lubrication pump 107 can pump lubricant into the lubrication circuit 122.

At 210, at least one cylinder of the engine is deactivated. The controller 112 can control the valve actuation system 108 to deactivate one or more cylinders 114 of the engine 102. For example, the controller 112 can to deactivate the first cylinder 114a and the second cylinder 114b of the four cylinders of the engine 102. However, the controller 112 can deactivate any one or more cylinders 114 of the engine 102. In some embodiments, the number x and identities of the cylinders 114 (say n) to deactivate can be stored in memory. For example, in some embodiments, the number of cylinders to deactivate can be a function of the difference between the catalyst temperature and the temperature threshold. The identities and the cylinders to deactivate can be stored in a lookup table in memory, which the controller 112 can access. Once the identities of the cylinders to deactivate is known, the controller 112 can control the valve actuation system 108 to deactivate the selected cylinders 114. In some embodiments, such as where the engine 102 utilizes an overhead cam design, the controller 112 can actuate a solenoid, which in turn moves a locking pin into a disengaging position. In this position, the rocking arms of the overhead cam assembly can be disengaged causing the intake and exhaust valves of a cylinder to remain in a closed position. In an alternative implementation, only the intake valve or only the exhaust valve may remain in a closed position. The controller 112 can actuate the solenoids associated with the intake and/or exhaust valves of the selected cylinders to deactivate the selected cylinders. In instances where the engine 102 utilizes fuel injection, the controller 112 can also deactivate the fuel injection to the selected cylinders. The controller 112 maintains the remainder of the cylinders of the engine 102 in an activated state. That is, the controller 112 ensures that the intake and exhaust valves of the cylinders not selected to be deactivated can open and close as normal.

Subsequent to deactivating the selected signals, cranking the engine occurs at 212. Once the controller 112 has deactivated the selected cylinders of the cylinders 114 of the engine 102, the controller 112 can crank the engine 102. For example, the controller 112 can activate the starter motor 110 coupled to the crankshaft 124 of the engine 102. Activating the starter motor 110 can start the engine 102. However, the engine 102 starts with x cylinders deactivated. In one example, as the engine 102 needs to produce the desired power with fewer cylinders, the engine 102 may run at higher revolutions-per-minute. This causes the exhaust gases 116 generated by the active cylinders to increase in temperature at a relatively higher rate than would otherwise occur when all n cylinders 114 of the engine 102 were active. As the exhaust gases 116 pass through the exhaust aftertreatment system 104, and in particular, through the catalyst 120, the temperature of the catalyst 120 also rises at a relatively higher rate than that when all cylinders 114 of the engine 102 were active. Thus, the temperature of the catalyst 120 can reach the desired temperature threshold at a relatively faster rate. As the amount of time that the catalyst 120 spends at a temperature that is below the desired threshold temperature is reduced, the amount of pollutants that are emitted into the environment is also reduced.

The controller 112 can continue to determine the temperature of the catalyst 120 during the operation of the engine 102 with x cylinders deactivated. When the temperature indicative of the catalyst temperature is above the threshold temperature, the controller 112 may activate all n cylinders 114 of the engine 102. In some examples, the controller 112 can progressively increase the number of cylinders 114 to activate. In some examples, the controller 112 can begin to activate one or more deactivated cylinders at a predetermined temperature below the threshold temperature.

The controller 112 also can switch off the pre-lubrication starter 106 (and thereby the pre-lubrication pump 107) prior to cranking the engine 102. For example, after starting the pre-lubrication starter 106, the controller 112 can monitor the pressure in the valve actuation system 108 based on the data received from the pressure sensor 128. If the pressure in the valve actuation system 108 is greater than a threshold value, the controller 112 can determine that the hydraulic pressure in the valve actuation system 108 has reached the desired value to allow deactivating one or more cylinders 114. Responsive to determining that the pressure is above the desired value, the controller 112 can switch off the pre-lubrication starter 106. The controller 112 may also switch off the pre-lubrication starter 106 based on a time period. For example, the controller 112 can switch off the pre-lubrication starter 106 after an amount of time that is considered sufficient to build up the desired hydraulic pressure in the valve actuation system 108. The period of time can be experimentally determined and can be stored in memory for access by the controller 112. In some examples, the pre-lubrication starter 106, can automatically (independently of the controller 112) switch off based on the pressure data received from the pressure sensor 128. That is, the pre-lubrication starter 106 can receive the data from the pressure sensor 128, and based on the sensed pressure value being greater than the desired value, can switch off the pre-lubrication pump 107 that pumps lubricant to the valve actuation system 108. In some such examples, the pre-lubrication starter 106 may also start the starter motor 110 after switching off the pre-lubrication pump 107.

FIG. 3 shows an example system 300 with a first configuration of a pre-lubrication starter in an engine. In the first configuration, a lubrication circuit 324 for providing lubricant to the engine 320 is internal to the engine, and a check valve 302 is positioned downstream of a lubricant pump 304. The lubrication circuit 324 includes conduits that are formed within the walls of the engine 320. The engine 320 can include a cylinder block 306, a cylinder head 308 including valve actuation system 310 positioned over the cylinder block 306, and a valve cover 312 positioned over the cylinder head 308. An oil pan 316 is positioned below the cylinder block 306 and can include a reservoir of oil or lubricant. The lubrication circuit 324 includes a lubricant supply path from the oil pan 316 to an oil inlet 318 in the cylinder head 308 and a lubricant return path from an oil outlet 322 back to the oil pan 316. The lubricant pump 304 and a pre-lubrication pump 314 pump lubricant from the oil pan into the lubrication circuit 324. The check valve 302 is positioned downstream from the lubricant pump 304 and upstream from a junction 330 at which the pre-lubrication pump 314 provides lubricant to the lubrication circuit 324. The check valve 302 can prevent lubricant output by the pre-lubrication pump 314 from entering the output of the lubricant pump 304. The pre-lubrication pump 314 can be similar to the pre-lubrication starter 106 discussed above in relation to FIGS. 1 and 2. The lubricant pump 304 can be coupled to a crankshaft of the engine 320 and can activate when the engine 320 is cranked.

The valve actuation system 310 can be similar to the valve actuation system 108 discussed above in relation to FIGS. 1 and 2. The valve actuation system 310 can include mechanisms to activate or deactivate one or more cylinders in the engine 320. The cylinder head 308 can include components in addition to the valve actuation system 310 such as, for example, one or more cams, intake and exhaust valves, oil jackets that couple to the lubrication circuit, fuel injectors, spark plugs, etc. The cylinder head 308 also can include one or more solenoids that can be actuated by a controller (such as the controller 112 discussed above in relation to FIGS. 1 and 2) to hydraulically activate or deactivate intake and/or exhaust valves of one or more cylinders of the engine 320.

The system 300 can operate in a manner similar to that discussed above in relation to FIGS. 1 and 2. For example, the controller can activate the pre-lubrication pump 314 based on an engine start event. The pre-lubrication pump 314 can pump lubricant from the oil pan 316 into the cylinder head 308, and in particular to the valve actuation system 310, via the lubrication circuit 324. The pre-lubrication pump 314 pumps lubricant into the junction 330. At this time, the lubricant pump 304 may not be pumping any oil as the engine 320 is not yet cranked. The check valve 302 reduces the risk of damage to the lubricant pump 304 by preventing lubricant pumped by the pre-lubrication pump 314 from entering the outlet of the lubricant pump 304. Pumping lubricant into the valve actuation system 310 can raise the hydraulic pressure in the valve actuation system 310, enabling the controller to deactivate intake and/or exhaust valves of one or more cylinders of the engine 320. Once the desired cylinders are deactivated, the controller can crank the engine 320, thereby activating the lubricant pump 304. The controller may also deactivate the pre-lubrication pump 314. The lubricant pump 304 can continue to pump lubricant into the lubrication circuit 324, while the engine 320 operates. As mentioned above, operating the engine 320 with one or more cylinders deactivated can allow the temperature of the exhaust gases generated by the engine 320 to rise at a higher rate than that when all cylinders are activated. As a result, the temperature of the catalyst in the exhaust aftertreatment system can also increase at a higher rate. The controller can continue to monitor the temperature of the catalyst and if the temperature is above the threshold temperature value, the controller can activate the previously deactivated cylinders.

FIG. 4 shows an example system 400 with a second configuration of a pre-lubrication starter in an engine. In the second configuration, the lubrication circuit 324 for providing lubricant to the engine 320 is internal to the engine, and the check valve 302 is positioned upstream of the lubricant pump 304. The check valve 302 can prevent flow of oil backwards into the lubricant pump 304. That is, the oil output by the pre-lubrication pump 314 is prevented from entering the lubricant pump 304 because the check valve 302 positioned upstream of the lubricant pump 304.

FIG. 5 shows an example system 500 with a third configuration of pre-lubrication starter in an engine. In the third configuration, a lubrication circuit 524 for providing lubricant to the engine 320 is at least partially external to the engine, and the check valve 302 is positioned downstream of the lubricant pump 304. The third configuration is similar to the first configuration shown in FIG. 3, however, the lubrication circuit 524 includes at least the supply path that is outside of the engine 320. In some examples, the return path instead of the supply path can be outside of the engine. In some other examples, both the supply path and the return path of the lubrication circuit 524 can be outside of the engine 320. Being outside of the engine can refer to including one or more conduits that are not defined by the surfaces of the engine 320. For example, additional pipes or conduits can be run on the outside of the engine 320 and provide a path from the oil pan 316 to the oil inlet 318. This configuration may be useful, for example, in conjunction with certain engine designs where it is difficult or not possible to access and/or utilize certain internal passages. The position of the check valve 302 is similar to that discussed above in relation to the system 300 shown in FIG. 3.

FIG. 6 shows an example system 600 with a fourth configuration of a pre-lubrication starter in an engine. In the fourth configuration, the lubrication circuit 524 for providing lubricant to the engine 320 is at least partially external to the engine, and the check valve 302 is positioned upstream of a lubricant pump 304. The fourth configuration is similar to the third configuration shown in FIG. 5 in that the lubrication circuit 524 of the example system 600 also includes at least a portion of the lubrication circuit 524 that is outside of the engine 320. As is the case for the third configuration, this configuration may be useful, for example, in conjunction with certain engine designs where it is difficult or not possible to access and/or utilize certain internal passages. Further, the system 600 is similar to the system 400 discussed above in relation to FIG. 4 in that the check valve 302 is positioned upstream of the lubricant pump 304.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A vehicle system, comprising:
   a valve actuation system;
   a pre-lubrication pump coupled to a lubrication circuit, the pre-lubrication pump configured to provide oil to the valve actuation system; and
   a controller communicably coupled to the valve actuation system and the pre-lubrication pump, the controller configured to:
   identify an engine start request,
   determine that a catalyst temperature is below a first threshold value, and
   in response to the catalyst temperature being below the first threshold value:
   actuate the pre-lubrication pump to direct lubricant to the valve actuation system,
   control the valve actuation system to deactivate at least one cylinder of an engine, and
   subsequent to deactivating the at least one cylinder of the engine, crank the engine.

2. The vehicle system of claim 1, wherein the at least one cylinder is deactivated by deactivating an intake valve and an exhaust valve for the at least one cylinder.

3. The vehicle system of claim 1, wherein the controller is further configured to:

subsequent to actuating the pre-lubrication pump, determine that a lubricant pressure in the valve actuation system is above a second threshold value, and
in response to determining that the lubricant pressure in the valve actuation system is above the second threshold value, deactivate the pre-lubrication pump.

4. The vehicle system of claim 1, wherein the controller is further configured to:
subsequent to cranking the engine, determine that the catalyst temperature is above the first threshold value, and
in response to determining that the catalyst temperature is above the first threshold value, control the valve actuation system to reactivate the deactivated at least one cylinder of the engine.

5. The vehicle system of claim 1, wherein the determination that the catalyst temperature is below the first threshold value is based upon a physical temperature measurement.

6. The vehicle system of claim 1, wherein the determination that the catalyst temperature is below the first threshold value is based upon a predicted temperature based upon operation of the engine.

7. The vehicle system of claim 1, wherein the determination that the catalyst temperature is below the first threshold value is based upon an amount of time that the engine has not been running.

8. The vehicle system of claim 1, wherein the pre-lubrication pump is affixed to a starter motor.

9. The vehicle system of claim 1, wherein the pre-lubrication pump is separate from a starter motor.

10. A method for increasing a temperature of exhaust gas from an engine, comprising:
identifying an engine start request;
determining whether a temperature of a catalyst is less than a threshold temperature, the catalyst in exhaust receiving communication with the engine;
in response to determining that the temperature of the catalyst is less than the threshold temperature, activating a pre-lubrication pump to direct lubricant to a valve actuation system;
operating the valve actuation system to deactivate one or more cylinders of the engine; and subsequent to activating the pre-lubrication pump and deactivating the one or more cylinders of the engine, cranking the engine.

11. The method of claim 10, further comprising:
determining whether a pressure within the valve actuation system is greater than a threshold pressure;
in response to determining that the pressure within the valve actuation system is greater than the threshold pressure, deactivating a pre-lubrication starter, the pre-lubrication starter coupled to the pre-lubrication pump; and
subsequent to deactivating the pre-lubrication starter, cranking the engine.

12. The method of claim 10, further comprising:
operating a pre-lubrication starter for a first duration;
determining whether the first duration is greater than a threshold duration;
in response to determining that the first duration is greater than the threshold duration, deactivating the pre-lubrication starter, the pre-lubrication starter coupled to the pre-lubrication pump; and
subsequent to deactivating the pre-lubrication starter, cranking the engine.

13. A method for increasing a temperature of exhaust gas from an engine, comprising:
- identifying an engine start request;
- operating a pre-lubrication starter for a first duration;
- determining whether a temperature of a catalyst is less than a threshold temperature, the catalyst in exhaust receiving communication with the engine;
- determining whether the first duration is greater than a threshold duration;
- in response to determining that the temperature of the catalyst is less than the threshold temperature, activating a pre-lubrication pump to direct lubricant to a valve actuation system; and
- in response to determining that the first duration is greater than the threshold duration, deactivating the pre-lubrication starter, the pre-lubrication starter coupled to the pre-lubrication pump; and
- subsequent to activating the pre-lubrication pump and deactivating the pre-lubrication starter, cranking the engine;
- wherein operating the pre-lubrication starter for the first duration indicates that a pressure within the valve actuation system is greater than a threshold pressure.

14. The method of claim 10, further comprising:
- determining a difference between the temperature of the catalyst and the threshold temperature; and
- deactivating the one or more cylinders of the engine based on the difference between the temperature of the catalyst and the threshold temperature.

15. A system for lubricating an engine prior to operating the engine, comprising:
- a valve actuation system coupled to one or more valves in communication with one or more cylinders of the engine;
- a lubrication circuit comprising:
  - an outlet to direct a lubricant from the valve actuation system to a reservoir;
  - a lubricant pump in fluid communication with the reservoir, the lubricant pump configured to direct the lubricant to an inlet of the valve actuation system while the engine is operating; and
  - a pre-lubrication pump in fluid communication with the reservoir, the pre-lubrication pump configured to direct the lubricant to an inlet of the valve actuation system before the engine is operating;
  - a pre-lubrication starter coupled to the pre-lubrication pump and configured to activate the pre-lubrication pump before the engine is operating, the pre-lubrication starter configured to respond to data corresponding to a parameter associated with the valve actuation system; and
  - a check valve configured to prevent the lubricant from traveling upstream in the lubrication circuit.

16. The system of claim 15, wherein the pre-lubrication pump directs the lubricant downstream of the check valve.

17. The system of claim 16, wherein the check valve is positioned downstream of the lubricant pump.

18. The system of claim 16, wherein the check valve is positioned upstream of the lubricant pump.

19. The system of claim 18, wherein the check valve is positioned within the reservoir.

20. A method for increasing a temperature of exhaust gas from an engine, comprising:
- identifying an engine start request;
- determining whether a temperature of a catalyst is less than a threshold temperature, the catalyst in exhaust receiving communication with the engine;
- determining whether a pressure within the valve actuation system is greater than a threshold pressure;
- in response to determining that the temperature of the catalyst is less than the threshold temperature, activating a pre-lubrication pump to direct lubricant to a valve actuation system;
- in response to determining that the pressure within the valve actuation system is greater than the threshold pressure, deactivating a pre-lubrication starter, the pre-lubrication starter coupled to the pre-lubrication pump; and
- subsequent to activating the pre-lubrication pump and deactivating the pre-lubrication starter, cranking the engine.

* * * * *